(12) United States Patent
Charpentier

(10) Patent No.: US 11,592,049 B2
(45) Date of Patent: Feb. 28, 2023

(54) DEVICE FOR FASTENING A LIGHT STRIP TO A MOTOR VEHICLE

(71) Applicant: Dr. Ing. h.c. F. Porsche Aktiengesellschaft, Stuttgart (DE)

(72) Inventor: Pierre Charpentier, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 206 days.

(21) Appl. No.: 17/177,250

(22) Filed: Feb. 17, 2021

(65) Prior Publication Data

US 2021/0254651 A1    Aug. 19, 2021

(30) Foreign Application Priority Data

Feb. 19, 2020   (DE) .................. 10 2020 104 316.3

(51) Int. Cl.
  *F16B 21/09*     (2006.01)
  *B60Q 3/78*      (2017.01)
(52) U.S. Cl.
  CPC ............. *F16B 21/09* (2013.01); *B60Q 3/78* (2017.02)
(58) Field of Classification Search
  CPC .................. B60Q 3/78; F16B 21/09
  See application file for complete search history.

(56) References Cited

U.S. PATENT DOCUMENTS

| 5,143,331 A | * | 9/1992 | Robert | B60Q 1/2642 403/353 |
| 5,420,762 A | * | 5/1995 | Lewis | B60Q 1/0441 24/701 |
| 9,499,092 B2 | * | 11/2016 | Dellock | H05B 47/105 |
| 10,281,113 B1 | * | 5/2019 | Salter | B60R 19/483 |

FOREIGN PATENT DOCUMENTS

| AT | 410918 B | 8/2003 |
| DE | 3803136 C1 | 2/1989 |
| DE | 102018205352 A1 | 10/2019 |
| EP | 2192003 A1 | 6/2010 |

* cited by examiner

*Primary Examiner* — Matthew J. Peerce
(74) *Attorney, Agent, or Firm* — Leydig, Voit & Mayer, Ltd.

(57) ABSTRACT

A device for fastening a light strip to a motor vehicle includes a mounting support and an opening having a first region with a first diameter and a second region arranged so as to be offset in relation to the first region. The second region has a second diameter smaller than the first diameter. The light strip is configured to be mounted on the mounting support in a form-fitting manner. A form-fitting connection between the mounting support and the light strip is established by a T bolt configured to be inserted into the first region and then displaced from the first region into the second region.

9 Claims, 4 Drawing Sheets

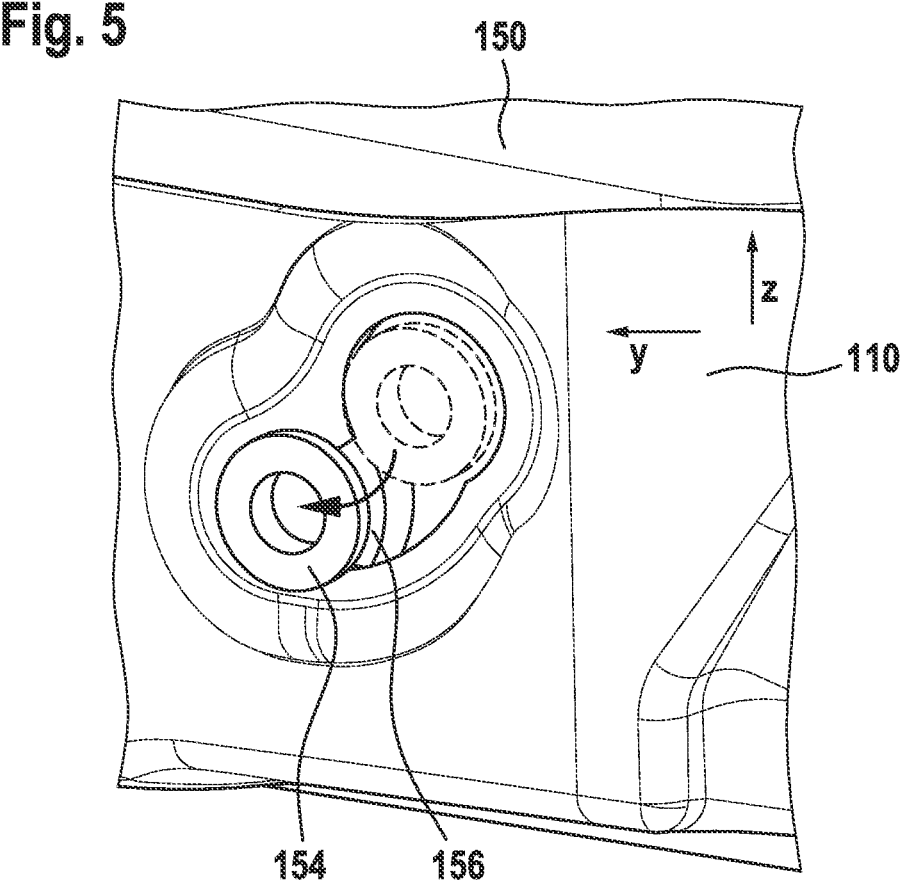

DEVICE FOR FASTENING A LIGHT STRIP TO A MOTOR VEHICLE

CROSS-REFERENCE TO PRIOR APPLICATIONS

Priority is claimed to German Patent Application No. DE 10 2020 104 316.3, filed on Feb. 19, 2020, the entire disclosure of which is hereby incorporated by reference herein.

FIELD

The present disclosure relates to a device for fastening a light strip to a motor vehicle.

BACKGROUND

EP 2 192 003 A1 discloses a vehicle light which is fastened to a motor vehicle body by way of a fastening device, wherein the fastening device comprises a plurality of T-bolt-slot connections.

It is desirable for such a fastening device to be further improved.

SUMMARY

In an embodiment, the present invention provides a device for fastening a light strip to a motor vehicle. The device includes a mounting support and an opening having a first region with a first diameter and a second region arranged so as to be offset in relation to the first region. The second region has a second diameter smaller than the first diameter. The light strip is configured to be mounted on the mounting support in a form-fitting manner. A form-fitting connection between the mounting support and the light strip is established by a T bolt configured to be inserted into the first region and then displaced from the first region into the second region.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 5 shows a schematic illustration of a portion of the mounting support and of a light strip.

DETAILED DESCRIPTION

Figure 1:
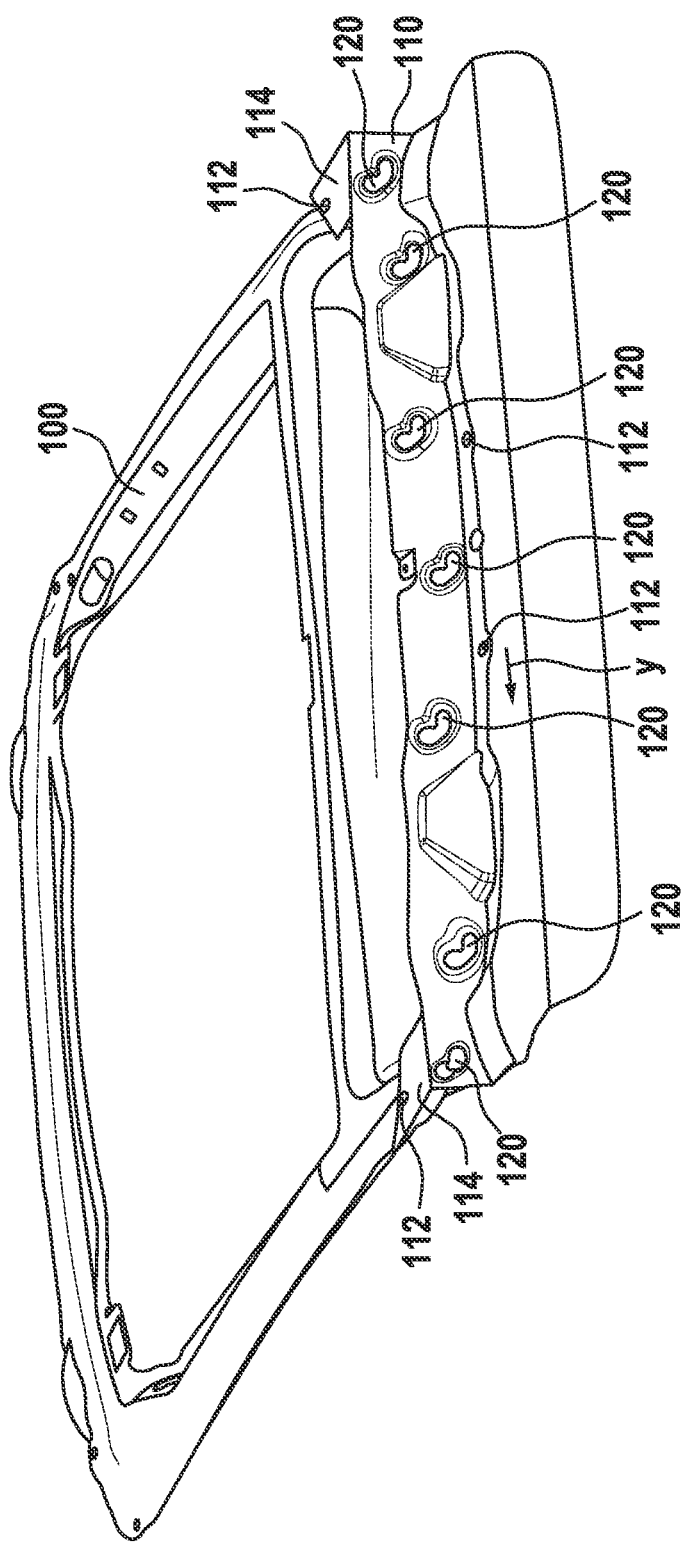
FIG. 1 shows a schematic illustration of part of a motor vehicle.

The device according to the present disclosure makes it possible to have very narrow joints between a body of the motor vehicle and the light strip and to avoid visible fastening elements.

A device for fastening a light strip to a motor vehicle comprises a mounting support, wherein an opening having a first region which has a first diameter is provided, wherein the opening comprises a second region which is arranged so as to be offset in relation to the first region, wherein the second region has a second diameter, wherein the second diameter is smaller than the first diameter, wherein the light strip can be mounted on the mounting support in a form-fitting manner, wherein a form-fitting connection between the mounting support and the light strip is established by a T-bolt which is inserted into the first region and then displaced from the first region into the second region. As a result, the light strip can be fixed on the motor vehicle without visible fastening elements.

The mounting support can preferably be fixed on the motor vehicle, in particular on a tailgate, and has the opening for accommodating a T-bolt arranged on the light strip.

The mounting support can have a fastening portion, in particular an angle, for connecting the mounting support to the motor vehicle, in particular by means of bolting. As a result, the mounting support can be fastened in a versatile manner.

The mounting support preferably takes the form of a strip which extends in a longitudinal direction, wherein the opening in the strip tapers in a direction different than the longitudinal direction. This makes it possible to achieve even more reliable fixing when mounting the mounting support on the motor vehicle by virtue of the taper being arranged in the direction in which gravitational force acts on the light arrangement.

A plurality of, in particular three, five or seven, openings are preferably arranged in the mounting support so as to be offset in relation to one another along the longitudinal direction. This improves fixing in the longitudinal direction.

The second region preferably has, in the longitudinal direction, an expansion which is larger than the second diameter. The expansion allows a tolerance in the longitudinal direction of for example +/−3 mm. This makes possible a displacement by which a thermal expansion of the light strip can be compensated for.

The first region can be arranged so as to be offset in relation to the fastening portion in the longitudinal direction. This allows particularly simple mounting of the light strip with the mounting support.

The mounting support preferably extends in a transverse direction, wherein the second region and the fastening portion are arranged in an axis substantially perpendicular to the longitudinal direction and so as to be offset in relation to one another in the transverse direction. This allows particularly good fixing of the light strip.

The mounting support can comprise plastic or sheet metal. As a result, the mounting support can be produced in a simple manner.

A corresponding system can have the device and the T-bolt with a head and a shank, wherein the head has a diameter which is smaller than the first diameter and larger than the second diameter, wherein the shank can be displaced in a first direction from the first region into the second region, and wherein the mounting support is designed to hold the shank in a form-fitting manner in the second region in a second direction different than the first direction.

The mounting support and the light strip are preferably designed in such a way that the light strip conceals the T-bolt and the opening in a third direction, which is substantially perpendicular to the first direction and to the second direction, when the T-bolt is arranged in the second region of the opening. A visually appealing overall appearance can be achieved as a result.

Further advantageous embodiments will become apparent from the following description and the drawing:

FIG. 1 schematically illustrates a device for fastening a light strip to a motor vehicle 100. The device comprises a mounting support 110.

The mounting support 110 can be fixed on the motor vehicle 100, in particular on a tailgate, at a fastening portion 112 or a plurality of fastening portions 112. The fastening portion 112 can be an angle 114. The fastening portion 112 is designed to connect the mounting support 110 to the motor vehicle 100, in particular by means of bolting.

The mounting support 110 comprises in the example a plurality of openings 120. The mounting support 110 can comprise plastic or sheet metal. The openings 120 are preferably through-openings passing through the mounting support 110.

Figure 2:
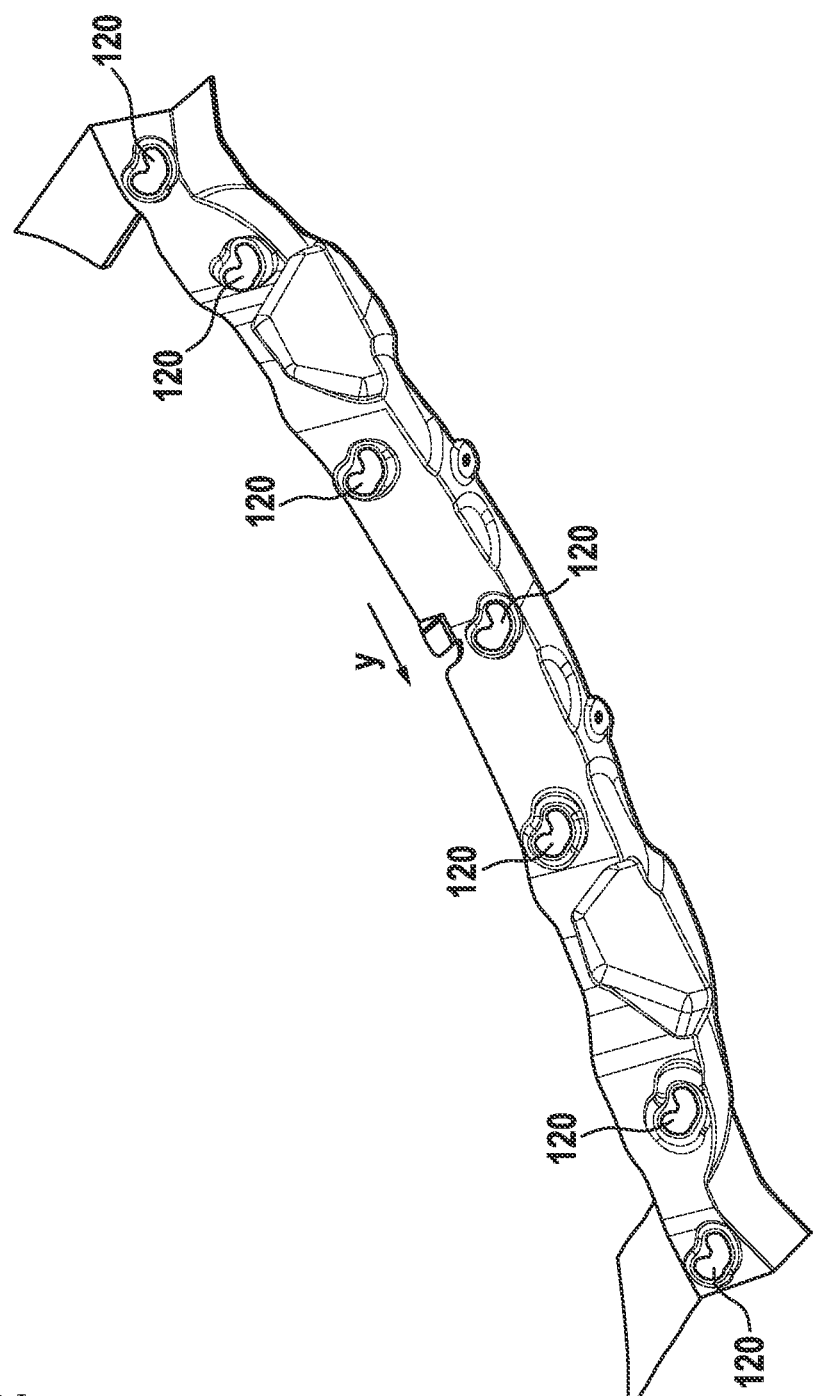
FIG. 2 shows a schematic illustration of a mounting support.

A schematic illustration of the mounting support 110 is also presented in FIG. 2.

A plurality of, in particular, three, five or seven, openings 120 are arranged in the mounting support 110 so as to be offset in relation to one another along a longitudinal direction y. In the example, the mounting support 100 takes the form of a strip which extends in the longitudinal direction y.

Figure 3:
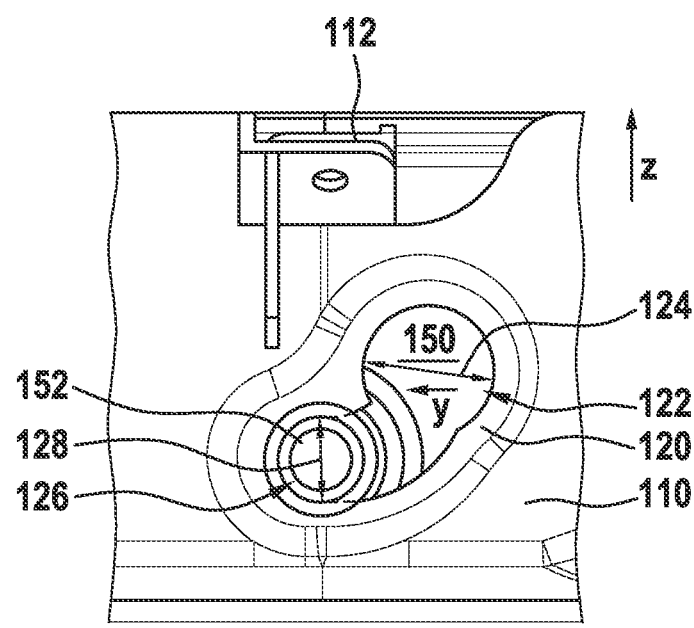
FIG. 3 shows a first detail view of the mounting support.

FIG. 3 illustrates a first detail view of the mounting support 110.

An opening 120 has in the example a first region 122 which has a first diameter 124. In the example, the opening 120 tapers in the strip in a direction different than the longitudinal direction y.

The opening 120 comprises a second region 126 which is arranged so as to be offset in relation to the first region 122. The second region 126 has a second diameter 128. The second diameter 128 is smaller than the first diameter 124. In the example, the opening 120 tapers between the first region 122 and the second region 126.

The opening 120 is designed to accommodate a T-bolt 152 arranged on a light strip 150.

The light strip 150 can be mounted on the mounting support 110 in a form-fitting manner.

A form-fitting connection between the mounting support 110 and the light strip 150 is established by the T-bolt 152 which is inserted into the first region 122 and then displaced from the first region 122 into the second region 126.

The mounting support 110 extends in a transverse direction z. In this example, the second region 126 and the fastening portion 112 are arranged in an axis substantially perpendicular to the longitudinal direction y and so as to be offset in relation to one another in the transverse direction z.

Figure 4:
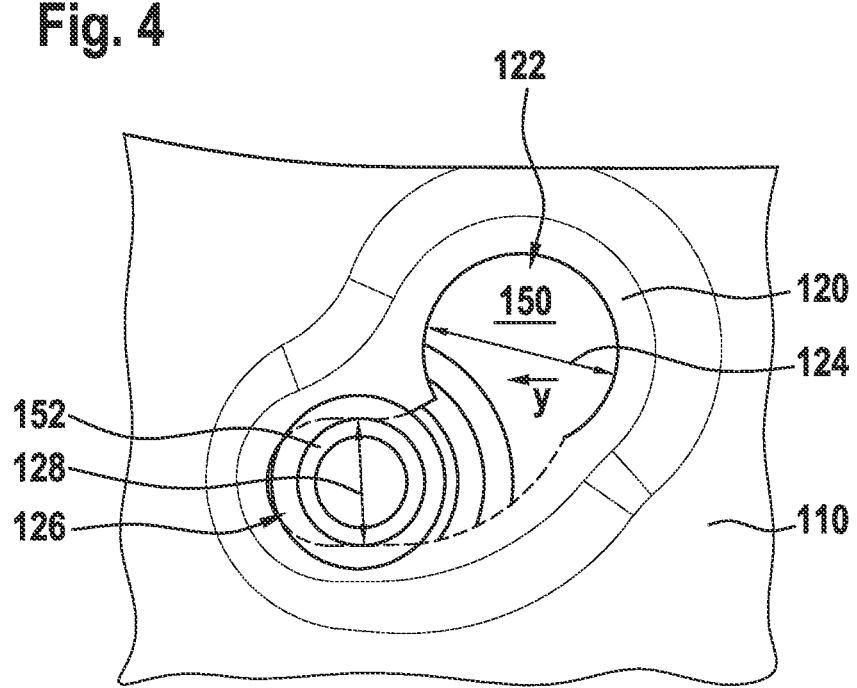
FIG. 4 shows a second detail view of the mounting support.

FIG. 4 schematically illustrates a second detail view of the mounting support 110.

By contrast with the opening 120 from the first detail view, the second region 126 has, in the longitudinal direction y, an expansion which is larger than the second diameter 128. The expansion is for example larger by 3 mm than the second diameter 128.

The described openings 120 can be arranged at different points of the mounting support 110. There can also be provision that only openings with expansion or only openings without expansions are arranged in a mounting support 110. In the example, the expansion in all openings 120 of the mounting support 110 is larger than the second diameter 128. In the example, all openings 120 of the mounting support 110 have the same geometric dimensions.

A system for fastening a light strip to a motor vehicle 100 will be described below on the basis of a schematic illustration, which is depicted in FIG. 5, of a portion of the mounting support 110 and of a light strip 150.

The system comprises the described device for fastening the light strip 150. The T-bolt 152 comprises a head 154 and a shank 156. The head 154 has a diameter which is smaller than the first diameter 124 and larger than the second diameter 128. The shank 156 can be displaced in a first direction from the first region 122 into the second region 126.

The mounting support 110 is designed to hold the shank 156 in a form-fitting manner in the second region 126 in a second direction z different than the first direction.

The mounting support 110 and the light strip 150 are designed in such a way that the light strip 150 conceals the T-bolt 152 and the opening 120 in a third direction x, which is substantially perpendicular to the first direction y and to the second direction z, when the T-bolt 152 is arranged in the second region of the opening 126.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for fastening a light strip to a motor vehicle, the device comprising:
   a mounting support, and
   an opening having a first region with a first diameter and having a second region arranged so as to be offset in relation to the first region, the second region having a second diameter, the second diameter being smaller than the first diameter,
   wherein the light strip is configured to be mounted on the mounting support in a form-fitting manner,
   wherein a form-fitting connection between the mounting support and the light strip is established by a T-bolt configured to be inserted into the first region and then displaced from the first region into the second region, wherein the mounting support is a strip that extends in a longitudinal direction, wherein the opening is an opening in the strip that tapers in a direction different than the longitudinal direction, and wherein a plurality of openings are arranged in the mounting support so as to be offset in relation to one another along the longitudinal direction.

2. The device as claimed in claim 1, wherein the mounting support is configured to be fixed on the motor vehicle and has the opening for accommodating the T-bolt arranged on the light strip.

3. The device as claimed in claim 1, wherein the mounting support has a fastening portion for connecting the mounting support to the motor vehicle.

4. The device as claimed in claim 1, wherein the second region has, in the longitudinal direction, an expansion which is larger than the second diameter.

5. The device as claimed in claim 1, wherein the first region is arranged so as to be offset in relation to the fastening portion in the longitudinal direction.

6. The device as claimed in claim 5, wherein the mounting support extends in a transverse direction, wherein the second region and the fastening portion are arranged in an axis substantially perpendicular to the longitudinal direction and so as to be offset in relation to one another in the transverse direction.

7. The device as claimed in claim 1, wherein the mounting support comprises plastic or sheet metal.

8. A system for fastening a light strip to a motor vehicle, the system comprising:
   a device comprising:
      a mounting support, and
      an opening having a first region with a first diameter and having a second region arranged so as to be offset in relation to the first region, the second region having a second diameter, the second diameter being smaller than the first diameter,
   wherein the light strip is configured to be mounted on the mounting support in a form-fitting manner,
   wherein a form-fitting connection between the mounting support and the light strip is established by a T-bolt configured to be inserted into the first region and then displaced from the first region into the second region,
   wherein the mounting support is a strip that extends in a longitudinal direction, wherein the opening is an opening in the strip that tapers in a direction different than the longitudinal direction, and
   wherein a plurality of openings are arranged in the mounting support so as to be offset in relation to one another along the longitudinal direction; and
   a T-bolt having a head and a shank,
   wherein the head has a diameter smaller than the first diameter and larger than the second diameter,
   wherein the shank is configured to be displaced in a first direction from the first region into the second region, and
   wherein the mounting support is configured to hold the shank in a form-fitting manner in the second region in a second direction different than the first direction.

9. The system as claimed in claim 8, wherein the mounting support and the light strip are configured such that the light strip conceals the T-bolt and the opening in a third direction, which is substantially perpendicular to the first direction and to the second direction, when the T-bolt is arranged in the second region of the opening.

* * * * *